Feb. 28, 1967 — L. BLUM — 3,306,585
FASTENER ASSEMBLY
Original Filed Dec. 18, 1961 — 2 Sheets-Sheet 1
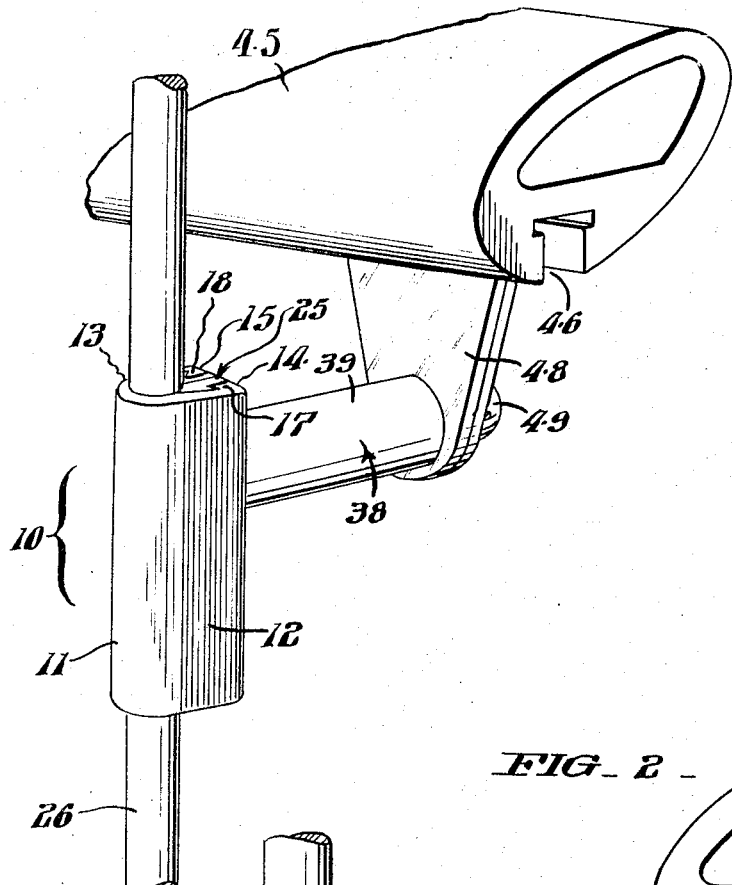
FIG_1_
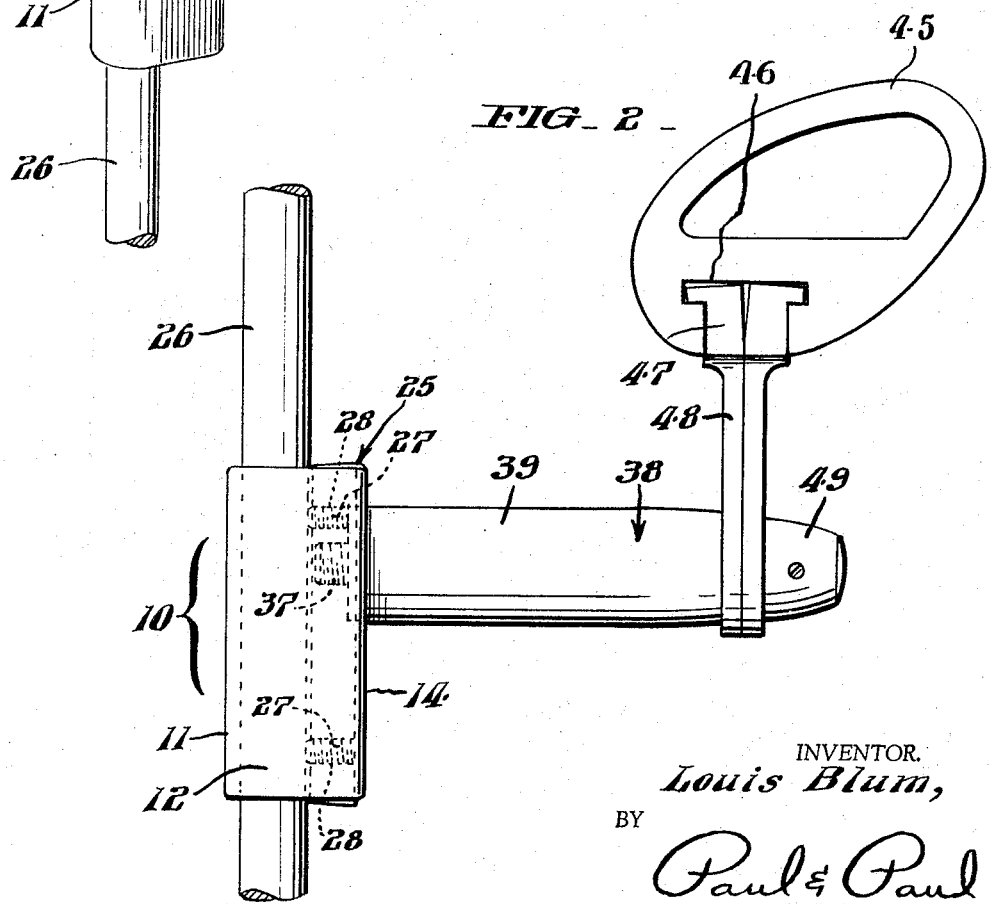
FIG_2_
INVENTOR.
*Louis Blum*,
BY
*Paul & Paul*
ATTORNEYS.

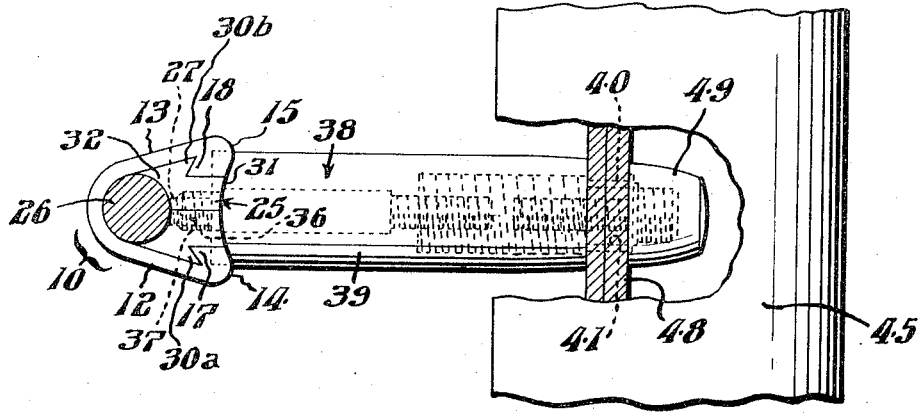
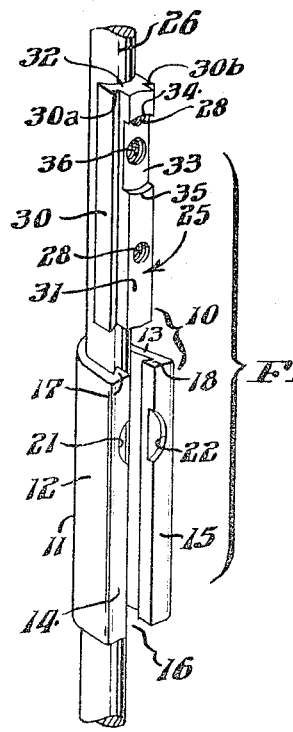
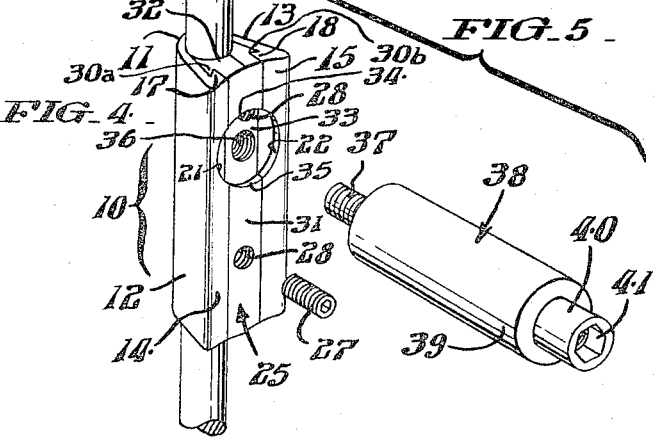

United States Patent Office 3,306,585
Patented Feb. 28, 1967

3,306,585
FASTENER ASSEMBLY
Louis Blum, Pittsburgh, Pa., assignor to Blumcraft of Pittsburgh, Pittsburgh, Pa., a firm
Original application Dec. 18, 1961, Ser. No. 160,012. Divided and this application May 28, 1964, Ser. No. 380,112
5 Claims. (Cl. 256—65)

This invention relates to railing structure. More particularly, this invention relates to fastener assemblies adapted for use in the construction of railing and similar structure.

It is an object of this invention to provide a fastener assembly for the support of railing structure and the like, the major units of which may be fabricated of extruded metal parts.

It is another object of this invention to provide a fastener assembly for the support of railing structure having component parts which may be easily and quickly assembled with the use of a minimum number of additional fastening elements and the like.

It is another object of this invention to provide a fastener assembly for the support of railing structure which may be economically and quickly produced and which is yet both durable and sturdy.

It is another object of this invention to provide a fastener assembly which is adapted to use with a plurality of vertical posts for the support of railings and the like at selected heights above the bases of said posts.

It is another object of this invention to provide a fastener for use with a plurality of vertical posts which is adapted to support railings and the like at any predetermined angle relative to said posts.

Other objects and attendant advantages of the invention will become more fully apparent hereinafter and in the drawings wherein:

FIG. 1 is a view in perspective of a fastener assembly as provided in accordance with this invention;

FIG. 2 is a view in end elevation of the fastener assembly;

FIG. 3 is a top plan view of the fastener assembly;

FIG. 4 is an exploded view in perspective of component parts of the fastener assembly; and FIG. 5 is another exploded view in perspective of the componet parts of the fastener assembly.

The following description is directed to the specific form of the invention illustrated in the drawings and is not intended to limit the scope of the invention itself which may be practiced in a wide variety of forms and arrangements.

Adverting herewith to the specific form of the invention illustrated in the drawings, a clamp element 10 as may be seen in FIG. 1, for example, is formed of extruded metal and comprises a curved rear wall 11 and side walls 12 and 13. Clamp 10 is open in the front and has inwardly extending flanges 14 and 15 formed integrally with the walls 12 and 13 respectively, the inward edges of said flanges being separated by a space 16. Flanges 14 and 15 are each formed with inwardly extending angular projections 17 and 18 each of which forms an acute angle with the inside surface of the respective walls 12 and 13. The clamp 10 is further provided with open segments 21 and 22 formed opposite each other in the front flanges 14 and 15 respectively intermediate the top and bottom ends of the clamp. As may be seen by reference to FIG. 5, the arcs of segments 21 and 22 are arcs of a circle defining an opening in the front of the clamp 10 comprised by the two segments 21 and 22 and the longitudinal space 16.

The clamp 10 is adapted to engage a fitting 25 which is secured to a post 26 by means of threaded screws 27 which screw into threaded holes 28 provided in the fitting for that purpose. The fitting 25 is provided with a base portion 30 having outwardly extending projections 30a and 30b which projections each form an acute angle with the side walls of a forwardly extending front portion 31 of the fitting. As may be clearly seen in FIG. 4, the angle formed by the projections 30a and 30b with the side walls of front portion 30, provides lateral grooves in the fitting 25 extending longitudinally thereof. The fitting 25 is further provided with a rear surface 32 curved to fit smoothly against the vertical circular post 26 in the manner shown in FIGS. 4 and 5, for example. The forwardly projecting portion 31 has formed therein an open space 33 having curved upper and lower edges 34 and 35 respectively, defined by arcs of a circle having a radius equal to the circle defined by the arcs of segments 21 and 22 of clamp 10. As may be clearly seen in FIG. 5, the walls of segments 21 and 22 and the curved edges 34 and 35 complete a circle in the assembled fastener. Midway between the edges 34 and 35 of the space 33 there is sunk into the fitting 25 a tapped hole 36 of dimension to receive a threaded end 37 of a connector element or bracket arm 38. Bracket arm 38 further comprises a generally cylindrical body portion 39 of substantially greater diameter than the threaded end 37 which body portion narrows at the end opposite the threaded end 37 to an end portion 40 of reduced diameter having formed in the end thereof a hexagonal socket 41.

As may be seen in FIGS. 1 and 2, a railing 45 is provided with a generally T-shaped slot 46 adapted to receive a corresponding generally T-shaped head 47 of a fitting or support section 48. The fitting or support section 48 is provided with a circular opening of dimension to receive the narrow end 40 of the bracket arm 38 which end extends through the hole and is capped by a cap 49 adapted to engage the end 40 and secure the support section 48 in position thereon.

In assembling the aforedescribed railing structure, fitting 25 is secured to the post 26 by means of screws 27 which are threaded into the threaded holes 28 and abut the post 26. With the fitting 25 secured in the desired position on the post 26 in the manner aforedescribed, clamp 10 is slid longitudinally along the post so that the curved wall 11 thereof is on the side of the post opposite the fitting 25 and so that the open end thereof is on the same side of the post as the fitting 25. The clamp 10 is then slid over the fitting 25 so that the inwardly projecting portions 17 and 18 enter the angular grooves formed by the outwardly projecting portions 30a and 30b of the base 30 of the fitting and so that the outwardly extending portions 30a and 30b enter the angular grooves formed by the inwardly extending portions 17 and 18 of the clamp 10. Clamp 10 is positioned over the fitting 25 so that the upper and lower ends of the arcs forming the segments 21 and 22 coincide with the ends of the arcs 34 and 35 to form an indented circular space. The threaded end 37 of the bracket arm 38 is then fitted into the tapped hole 36 so that the body portion 39 of wider diameter enters the indented circular space formed by the coinciding arcs of edges 34 and 35 of fitting 25 and of the segments 21 and 22 of clamp 10. Thereafter, the support section 48 is secured to the railing 45 is fitted over the end 40 of the bracket arm 38 and secured in position by the cap 49 which engages the end 40 of the bracket 38.

It will be apparent that it is an important advantage of the invention as aforedescribed that a railing structure is provided thereby which may be assembled easily and quickly with the use of a minimum number of fastening elements and the like.

Still another important feature of the invention resides in the manner of construction thereof in which a fastening assembly is provided for a railing structure whereby a handrail and the like may be used with a plurality of vertical posts and arranged for support thereby at any predetermined angle relative to the aforesaid posts.

Although this invention has been described with reference to specific forms and embodiments thereof, it should be evident that a great number of variations may be made without departing from the spirit and scope of this invention. For example, parts may be reversed, equivalent elements may be substituted for those specifically disclosed and certain features of the invention may be used independently of other features, all without departing from the spirit and scope of this invention defined in the appended claims.

I claim:

1. In a railing structure, the combination comprising a post, a railing on one side of said post, and means for supporting said railing on said post including an elongated clamp part generally U-shaped in transverse section embracing said post and disposed with its open side and the longitudinally extending terminal surfaces thereof facing toward the railing, an elongated fitting on the railing side of said post disposed between and interlocked with the opposed legs of said clamp part, the longitudinally extending terminal surfaces of said clamp part and the surface of said fitting facing toward said railing being smoothly merged, means urging said fitting away from said post and thereby drawing said clamp part tight against said post, and an elongated connector element having one end portion threaded into said fitting and extending laterally from said fitting for supporting said railing upon the other end thereof.

2. The combination according to claim 1 wherein the means urging the fitting away from the post and thereby drawing the clamp part tight against the post consists of a pair of elements threaded into longitudinally spaced portions of said fitting and disposed with their ends abutting said post.

3. The combination according to claim 1 wherein a reduced diameter end portion of the connector element is threaded into the fitting, and the opening into which the reduced diameter end portion is threaded is counterbored for receiving a larger diameter main body portion of the connector element.

4. The combination according to claim 2 wherein a reduced diameter end portion of the connector element is threaded into the fitting, the opening into which the reduced diameter end portion is threaded is counterbored for receiving a larger diameter main body portion of the connector element, and one threaded element of the pair thereof is threaded through the annular flat shoulder at the bottom of the counterbore.

5. The combination according to claim 3 wherein the diameter of the counterbore is greater than the distance between the opposed legs of the clamp part so that it is formed conjointly by depressions in the opposed legs of the clamp part and in the fitting.

References Cited by the Examiner

UNITED STATES PATENTS

| 945,213 | 1/1910 | Blackburn | 287—54 X |
| 1,328,930 | 1/1920 | Stern | 248—231 |
| 1,459,856 | 6/1923 | Otte | 248—231 |
| 1,974,092 | 9/1934 | Alsaker | 287—54 X |
| 1,991,075 | 2/1935 | Bloomquist | 287—54 X |
| 2,046,942 | 7/1936 | Goeller | 287—54 X |
| 2,904,314 | 9/1959 | Thom | 256—65 |

FOREIGN PATENTS

| 1,005,792 | 1/1952 | France. |

REINALDO P. MACHADO, *Primary Examiner.*

HARRISON R. MOSELEY, *Examiner.*

D. L. TAYLOR, *Assistant Examiner.*